United States Patent [19]
Chen

[11] Patent Number: 6,010,229
[45] Date of Patent: Jan. 4, 2000

[54] DEVICE FOR ENHANCING AND SHIELDING THE LIGHT EMITTED FROM A ROD-SHAPED LIGHT SOURCE FOR IMAGE SCANNER WITH CHARGE COUPLED DEVICE

[75] Inventor: Sheng-Kao Chen, Hsinchu, Taiwan

[73] Assignee: Acer Peripherals, Inc., Taoyuan, Taiwan

[21] Appl. No.: 08/969,574

[22] Filed: Nov. 13, 1997

[51] Int. Cl.[7] .......................................... F21S 3/00
[52] U.S. Cl. ........................ 362/217; 362/298; 362/299; 362/346; 362/326; 362/327; 362/328
[58] Field of Search .................. 362/217, 298, 362/299, 346, 326, 327, 328

[56] References Cited

U.S. PATENT DOCUMENTS

| | | | |
|---|---|---|---|
| D. 136,383 | 9/1943 | Guth | 362/217 |
| 413,636 | 10/1889 | Van Gestel | 362/217 |
| 4,914,308 | 4/1990 | Hochgraf | 250/572 |
| 5,136,402 | 8/1992 | Nagano | 358/483 |

*Primary Examiner*—Sandra O'Shea
*Assistant Examiner*—Ronald E. Delgizzi
*Attorney, Agent, or Firm*—Pillsbury Madison & Sutro LLP

[57] ABSTRACT

A device for enhancing and shielding the light emitted from a rod-shaped light source. The device includes a plate strip made of light-reflecting material or provided with light-reflecting means disposed between the rod-shaped light source and a holder for holding the rod-shaped light source along the longitudinal axis direction thereof. The plate strip has an inwardly curved edge extending from the two ends thereof to the center. The width of the plate strip is gradually tapered from the two ends to the center.

6 Claims, 4 Drawing Sheets

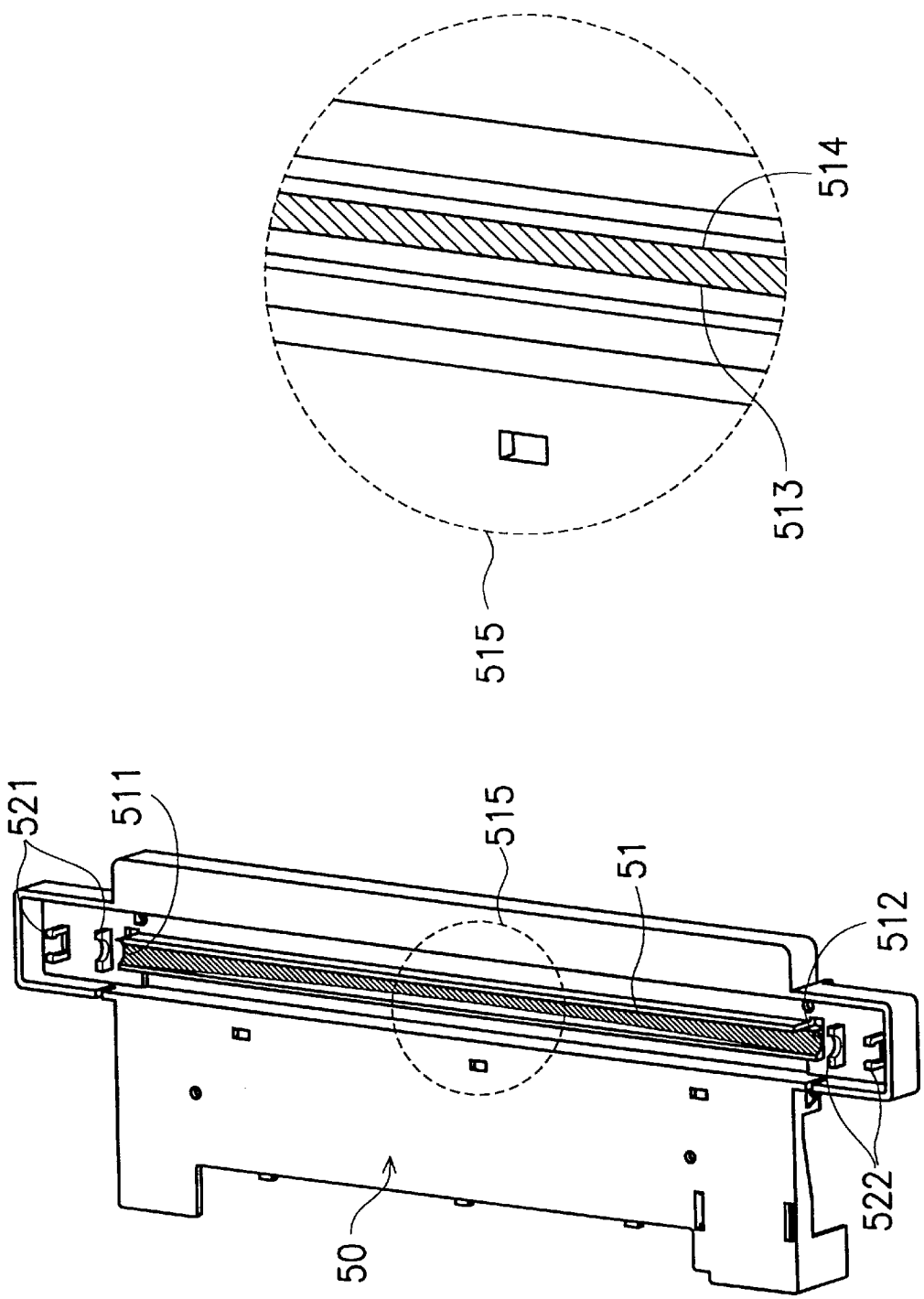

DEVICE FOR ENHANCING AND SHIELDING THE LIGHT EMITTED FROM A ROD-SHAPED LIGHT SOURCE FOR IMAGE SCANNER WITH CHARGE COUPLED DEVICE

FIELD OF THE INVENTION

The present invention relates to a device for enhancing and shielding the light emitted from a rod-shaped light source. In particular, it relates to a device designed for enhancing and shielding the light emitted from a rod-shaped light source of an image retrieve device so as to uniformly distribute the light intensity on the scanned object.

DESCRIPTION OF THE RELATED ART

Referring to FIG. 1, a schematic view of an image retrieve device 10 is shown. The image retrieve device 10 includes a light source 11, three reflecting mirrors 13, 14 and 15, a lens 16, and a charge-coupled device (CCD) 17. The light source 11 emits light onto an object 12, usually an article having a bar code or a document, and impinges an image onto the reflecting mirror 13. The image is then reflected by the reflecting mirrors 13, 14 and 15 along the direction shown by the arrows, and then is impinged onto the lens 16. The lens 16 focuses the reflected image of the article 12 and impinges the reflected image is converted into corresponding analog signals in accordance with the intensity of the light received. The analog signals are then converted into digital signals by a signal-processing device (not shown).

The lamp 11 is usually a rod-shaped light source, for example a flourescent tube, and has a length equal to the width of the object 12 to be scanned. When the light emitted from the rod-shaped light source 11 impinges onto the object 12, the intensity radiated onto the object 12 is not uniformly distributed. FIG. 2 is a schematic diagram showing the light intensity distribution on the object 12 along the longitudinal axis direction of the rod-shaped light source 11. It is shown that at the A section of the object 12, i.e., the central portion of the object 12, the intensity of the light impinged thereon is stronger than that at the B or C sections. Note that the diagrams are only for explanation, and the real light intensity distribution is not as shown. This non-uniform distribution of the light intensity affects how the image picked up.

FIG. 3a is an exploded perspective view of a known device for shielding and enhancing the light emitted from a rod-shaped light source used in an image retrieve device. The rod-shaped light source 31 is disposed in a housing 34, which is covered with a shielding plate 33. The shielding plate 33 has a substantially long slot 71 along the longitudinal axis direction thereof and is made of non-transparent material. Two edges 331, 332 are formed along the long slot 33 and are inwardly curved from their two ends 333, 334 to the center thereof. Two light-enhancing plates 60, 60 made of light-reflecting material are disposed at the two ends of the rod-shaped light source 31. FIG. 3b is a perspective view of the assembled device of FIG. 3a. By this arrangement, the light emitted from the rod-shaped light source 31 is more enhanced at the two ends than at the center thereof, and thus the light intensity radiated onto the object to be scanned is uniformly distributed.

FIG. 4 is a schematic view showing how the device of FIG. 3a is arranged in an image retrieve device 4.

The known device shown in FIG. 3a can indeed make the light intensity radiated onto an object uniform. However, the assembling of such a device is complicated due to the incorporation of a shielding plate and enhancing plates, and thus is not cost efficient.

SUMMARY OF THE INVENTION

An object of the invention is therefore to provide a device for shielding and enhancing the light emitted from a rod-shaped light source, which can uniformly distribute the light radiated onto an object, uses only one plate for both shielding and enhancing functions, and can easily be assembled.

To attain the object of the invention, instead of using both a light-shielding plate and light-enhancing plate, the invention features a plate strip made of light-reflecting material or provided with light-reflecting means disposed between a rod-shaped light source and a holder for holding the rod-shaped light source along the longitudinal axis direction thereof, and having an inwardly-curved edge.

According to an aspect of the invention, the inwardly curved edge is extended from its one end to another end so that the width of the plate strip is gradually tapered from the two ends to center thereof.

BRIEF DESCRIPTION OF THE DRAWINGS

The present invention can be more fully understood by reference to the following detailed description and preferred embodiment with reference made to the accompanying drawings, wherein:

FIG. 3b is an exploded view of the assembled device of FIG. 3a;

FIG. 5 is a perspective view of the device of a preferred embodiment of the invention;

FIG. 6 is an enlarged view of the plate strip; and

DETAILED DESCRIPTION OF THE INVENTION

Figure 1:
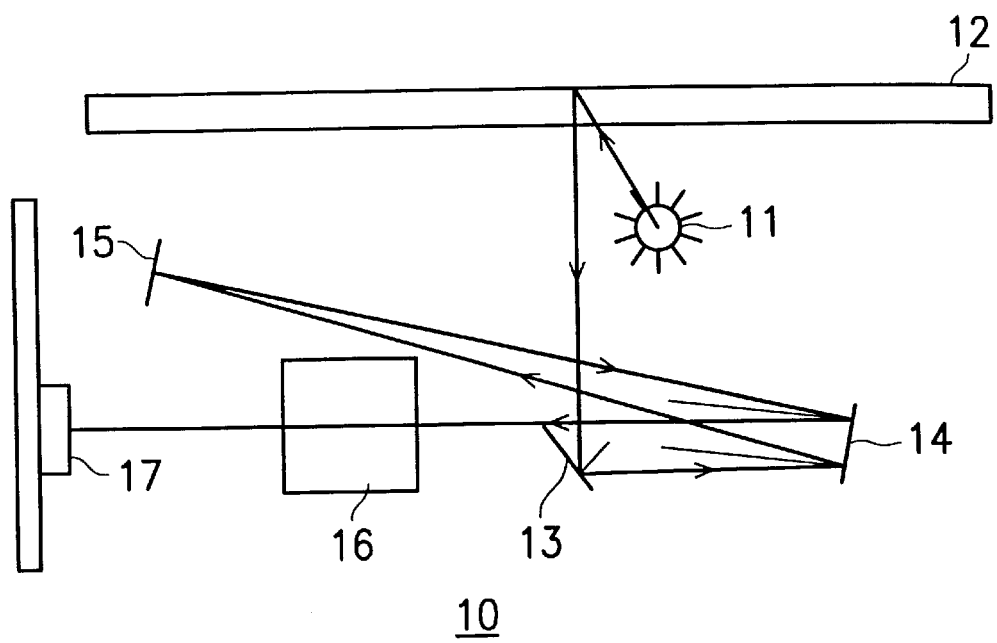
FIG. 1 is a schematic diagram of a conventional image retrieve device.
Figure 2:
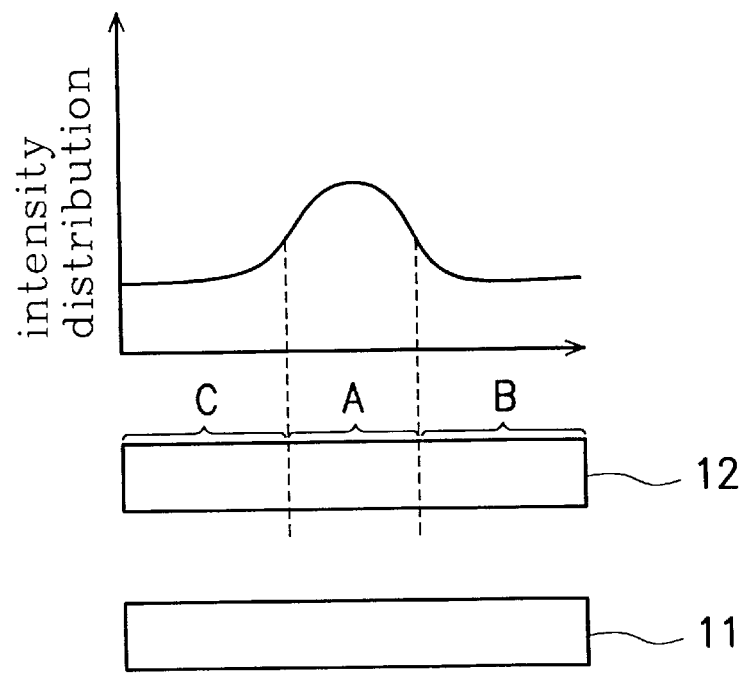
FIG. 2 shows the light intensity distribution on the object 12 along the longitudinal axis direction of the rod-shaped light source 11.
Figure 3A:
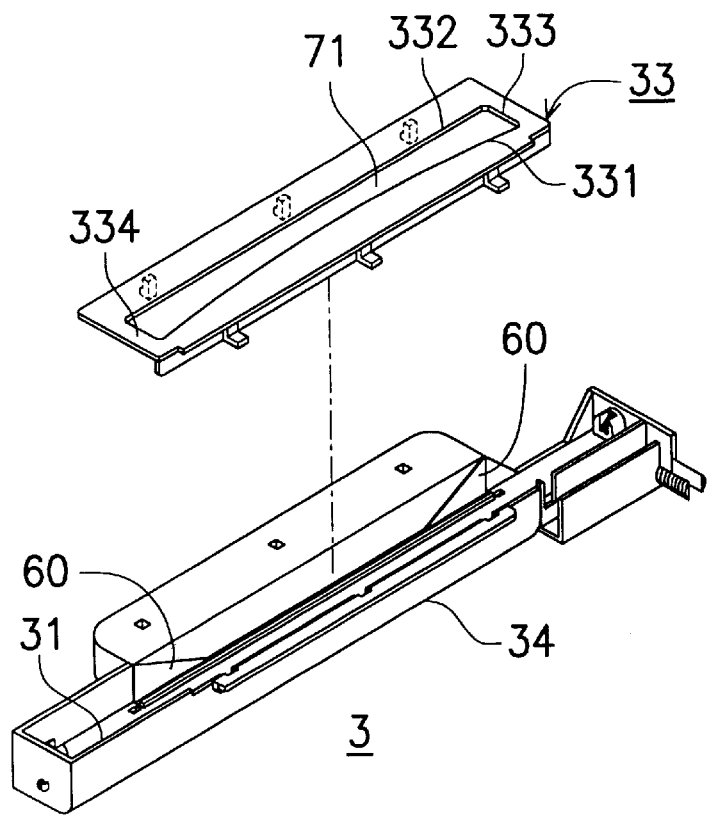
FIG. 3a is an exploded perspective view of a known device for shielding and enhancing light emitted from a rod-shaped light source.
Figure 3B:
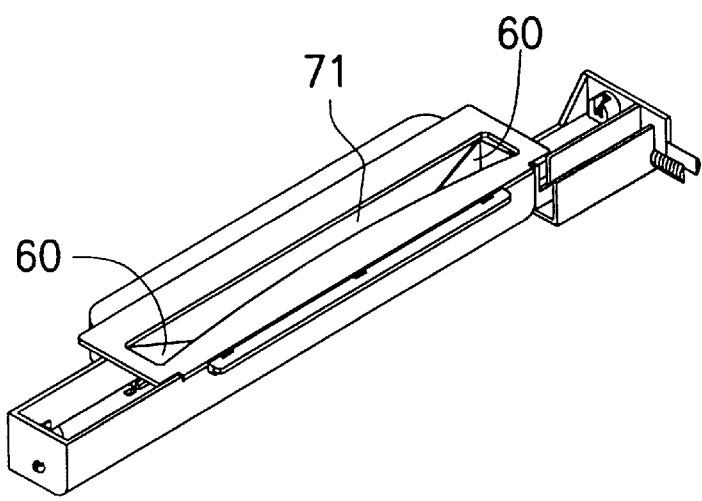
Figure 4:
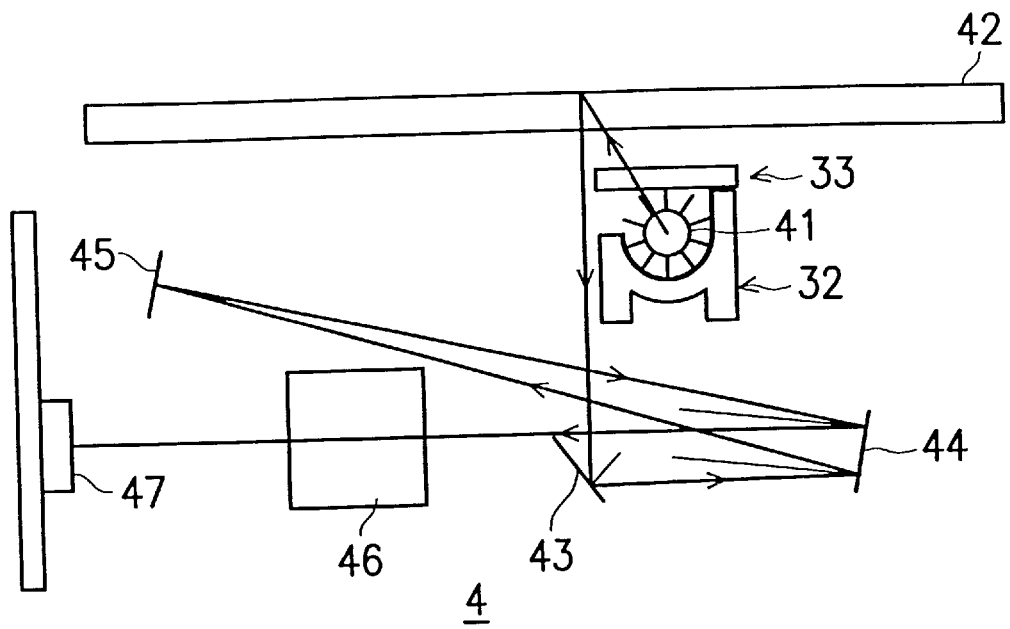
FIG. 4 is a schematic diagram of a conventional image retrieve device using the device of FIG. 3b.

Referring to FIG. 5, the device for enhancing and shielding the light emitted from a rod-shaped light source (not shown) includes a holder 50 for holding the light source and a plate strip 51 (hatched). The holder 50 includes seats 521, 522 for respectively supporting the two ends of the rod-shaped light source. The plate strip 51 is made of light-reflecting material, such as a stainless steel plate, or any material having a smooth surface for reflecting light impinged thereon. Adhering or attaching a light-reflecting coating layer onto the plate strip 51 can also obtain the same function. A rod-shaped light source (not shown) is to be mounted on the seats 521 and 522. The plate strip 51 is disposed between the holder 50 and the rod-shaped light source with its two ends 511, 512 respectively closing to the seats 521 and 522. The two edges 513, 514 of the plate strip 51 are both inwardly curved and extended from the ends 511, 512 respectively to the center 515 thereof so that the width of the plate strip 51 is gradually tapered from the two ends 511, 512 to the central portion 515. FIG. 6 is an enlarged diagram of the central portion 515. In this way, the light emitted from the rod-shaped light source is more enhanced at the two ends 511, 512 than the central portion 515, and thus the light intensity impinged onto the object to be scanned can be uniformly distributed. The plate strip 51 substantially provides both shielding and enhancing of the light emitted from the rod-shaped light source and can be easily mounted.

Figure 7:
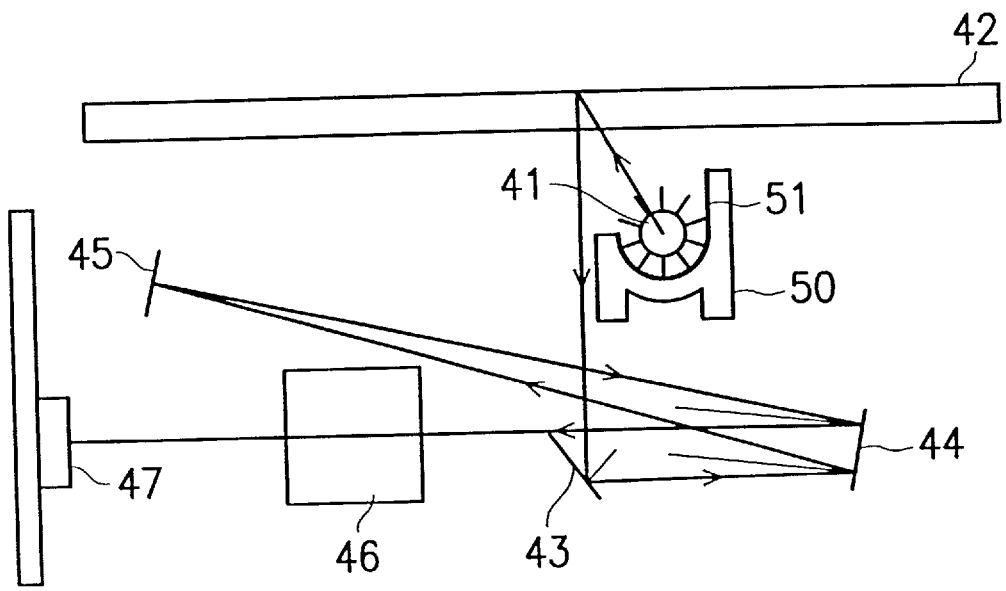
FIG. 7 is a schematic view of an image retrieve device using the device of FIG. 6.

FIG. 7 is a schematic view showing that the device of FIG. 5 is arranged in an image pickup device 7.

What is claimed is:

1. A device for enhancing and shielding the light emitted from a rod-shaped light source, comprising:

a holder for holding the rod-shaped light source; and a plate strip made of light-reflecting material or provided with a light-reflecting means, for enhancing the light emitted from the rod-shaped light source, disposed between said holder and the rod-shaped light source substantially parallel to the longitudinal axis direction of the rod-shaped light source, having a first end and a second end disposed on the opposite end thereof along the longitudinal axis direction of said plate strip, and having at least one inwardly curved edge extending from said first end to said second end.

2. The device for enhancing and shielding the light emitted from a rod-shaped light source as claimed in claim 1, wherein said holder has a first seat and a second seat for respectively supporting the two ends of the rod-shaped light source, and said plate strip has a first end disposed closing to the first seat and a second end disposed closing to said second seat.

3. The device as claimed in claim 2, wherein said at least one inwardly curved edge is so extended from the first end to the second end that the width of the plate strip is gradually reduced from the first end and the second end to the center thereof.

4. A light-emitting assembly comprising:

a rod-shaped light source;

a holder for holding the rod-shaped light source; and a plate strip made of light-reflecting material or provided with a light-reflecting means, for enhancing and shielding the light emitted from the rod-shaped light source, disposed between said holder and said rod-shaped light source substantially parallel to the longitudinal axis direction of the rod-shaped light source, having a first end and a second end disposed on the opposite end thereof along the longitudinal axis direction of said plate strip, and having at least one inwardly curved edge extended from said first end to said second end.

5. A device for scanning an object and outputting an analog signal, comprising:

a light emitting assembly for emitting a light on the object to obtain an image;

a reflecting mirror assembly for reflecting the image;

a lens for focusing the reflected image; and a charge-coupled device for converting the focused reflected image to corresponding analog signal;

wherein said light-emitting assembly includes a rod-shaped light source; a holder for holding the rod-shaped light source; and a plate strip made of light-reflecting material or provided with a light-reflecting means, for enhancing the light emitted from the rod-shaped light source, disposed between said holder and said rod-shaped light source substantially parallel to the longitudinal axis direction of the rod-shaped light source, having a first end and a second end disposed of the opposite end thereof along the longitudinal axis direction of said plate strip, and having at least one inwardly curved edge extended from said first end to said second end.

6. A device for enhancing and shielding the light emitted from a rod-shaped light source, comprising:

a holder for holding the rod-shaped light source; and a plate strip made of light-reflecting material or provided with a light-reflecting means, for reflecting the light emitted from the rod-shaped light source, disposed between said holder and the rod-shaped light source substantially parallel to the longitudinal axis direction of the rod-shaped light source, having a first end and a second end disposed on the opposite ends thereof along the longitudinal axis direction of said plate strip, a center portion disposed between said first end portion and said second end portion, and the width of said plate strip being gradually reduced inwardly from said first end and said second end to said center portion.

* * * * *